US007631305B2

(12) United States Patent
Rong et al.

(10) Patent No.: US 7,631,305 B2
(45) Date of Patent: Dec. 8, 2009

(54) METHODS AND PRODUCTS FOR PROCESSING LOOP NESTS

(75) Inventors: Hongbo Rong, Newark, DE (US); Guang R. Gao, Newark, DE (US); Alban Douillet, Newark, DE (US); Ramaswamy Govindarajan, Bangalore (IN)

(73) Assignee: University of Delaware, Newark, DE (US)

( * ) Notice: Subject to any disclaimer, the term of this patent is extended or adjusted under 35 U.S.C. 154(b) by 836 days.

(21) Appl. No.: 10/944,986

(22) Filed: Sep. 20, 2004

(65) Prior Publication Data

US 2005/0097509 A1    May 5, 2005

Related U.S. Application Data

(60) Provisional application No. 60/504,043, filed on Sep. 19, 2003, provisional application No. 60/507,043, filed on Sep. 29, 2003.

(51) Int. Cl.
*G06F 9/45* (2006.01)

(52) U.S. Cl. .................. 717/161; 717/152; 717/153; 717/160

(58) Field of Classification Search ......... 717/151–161; 712/1–207
See application file for complete search history.

(56) References Cited

U.S. PATENT DOCUMENTS

| 5,802,375 | A  | * | 9/1998  | Ngo et al. ............. 717/160 |
| 5,958,048 | A  |   | 9/1999  | Babaian et al. |
| 6,182,210 | B1 | * | 1/2001  | Akkary et al. ............. 712/235 |
| 6,192,515 | B1 | * | 2/2001  | Doshi et al. .............. 717/161 |
| 6,230,317 | B1 |   | 5/2001  | Wu |
| 6,438,747 | B1 | * | 8/2002  | Schreiber et al. ........... 717/160 |
| 6,820,250 | B2 |   | 11/2004 | Muthukumar et al. |
| 6,957,304 | B2 | * | 10/2005 | Wilkerson ................. 711/137 |
| 2002/0055964 | A1 |   | 5/2002  | Luk et al. |

FOREIGN PATENT DOCUMENTS

CN        1294345 A        5/2001

OTHER PUBLICATIONS

Unger, A., Zehendner, E., and Ungerer, T. 2000. A combined compiler and architecture technique to control multithreaded execution of branches and loop iterations. SIGARCH Comput. Archit. News 28, 1 (Mar. 2000), 53-61. DOI=http://doi.acm.org/10.1145/346023.346044.*

(Continued)

*Primary Examiner*—Jason Mitchell
(74) *Attorney, Agent, or Firm*—RatnerPrestia

(57) ABSTRACT

Methods and products for processing a software kernel of instructions are disclosed. The software kernel has stages representing a loop nest. The software kernel is processed by partitioning iterations of an outermost loop into groups with each group representing iterations of the outermost loop, running the software kernel and rotating a register file for each stage of the software kernel preceding an innermost loop to generate code to prepare for filling and executing instructions in software pipelines for a current group, running the software kernel for each stage of the software kernel in the innermost loop to generate code to fill the software pipelines for the current group with the register file being rotated after at least one run of the software kernel for the innermost loop, and repeatedly running the software kernel to unroll inner loops to generate code to further fill the software pipelines for the current group.

32 Claims, 17 Drawing Sheets

OTHER PUBLICATIONS

Tzi-Cker Chiueh, Multi-Threaded Vectorization, Computer Architecture News, Association for Computing Machinery, vol. 19, No. 3, May 1, 1991, pp. 352-361.

International Search Report for PCT International Application No. PCT/US2004/030634 mailed Aug. 31, 2005.

A. Aiken and A. Nicolau, Fine-grain parallelization and the wavefront method, Languages and Compilers for Parallel Computing, MIT Press, 1990, pp. 1-16.

A. Aiken, A. Nicolau and S. Novack, Resource-constrained software pipelining, IEEE Transactions on Parallel and Distributed Systems, 6(12):1248-1270, Dec. 1995.

V. H. Allan, R. B. Jones, R. M. Lee and S. J. Allan, Software pipelining, ACM Computing Surveys, 27(3):367-432, Sep. 1995.

S. Carr, C. Ding and P. Sweany, Improving software pipelining with unroll-and-jam, In Proc. $29^{th}$ Annual Hawaii International Conference on Systems Sciences, pp. 183-192, 1996.

S. Carr and K. Kennedy, Improving the ratio of memory operations to floating-point operations in loops, ACM Trans. on Programming Languages and Systems, 16(6):1768-1810, Nov. 1994.

A. Darte and Y. Roberts, Constructive methods for scheduling uniform loop nests, IEEE Transactions on Parallel and Distributed Systems, 5(8):814-822, Aug. 1994.

G. R. Gao, Q. Ning and V. Van Dongen, Software pipelining for nested loops, ACAPS Tech. Memo 53, Sch. of Comp. Sci., McGill U., Montreal, Quebec, May 1993.

R. Govindarajan, E. R. Altman and G. R. Gao, A framework for resource-constrained rate-optimal software pipelining, IEEE Trans. on Parallel and Distrib. Systems, 7(11):1133-1149, Nov. 1996.

R. A. Huff, Lifetime-sensitive modulo scheduling, In Proc. of the ACM SIGPLAN '93 Conf. on Programming Language Design and Implementation, pp. 258-267, Albuquerque, New Mexico, Jun. 1993.

M. Lam, Software pipelining: An effective scheduling technique for VLIW machines, In Proc. of the SIGPLAN '88 Conf. on Programming Language Design and Implementation, pp. 318-328, Atlanta, Georgia, Jun. 1988.

L. Lamport, The parallel execution of DO loops, Comm. of the ACM, 17(2):83-93, Feb. 1974.

S. -M. Moon and K. Ebcioglu, Parallelizing nonnumerical code with selective scheduling and software pipelining, ACM Transactions on Programming Languages and Systems, 19(6):853-898, Nov. 1997.

K. Muthukumar and G. Doski, Software pipelining of nested loops, Lecture Notes in Computer Science, 2027:165-??, 2001.

D. Petkov, R. Harr and S. Amarasinghe, Efficient pipelining of nested loops: unroll-and-squash, In $16^{th}$ International Parallel and Distributed Processing Symposium (IPDPS '02 (IPPS and SPDP)), pp. 19-29, Washington—Brussels—Tokyo, Apr. 2002, IEEE.

J. Ramanujam, Optimal software pipelining of nested loops, In Proc. of the $8^{th}$ Intl. Parallel Processing Symp., pp. 335-342, Cancun, Mexico, Apr. 1994, IEEE Comp. Soc.

B. R. Rau, Iterative modulo scheduling: An algorithm for software pipelining loops, In Proc. of the $27^{th}$ Ann. Intl. Symp. on Microarchitecture, pp. 63-74, San Jose, Calif., Nov.-Dec. 1994.

B. R. Rau and J. A. Fisher, Instruction-level parallel processing: History, overview and perspective, J. of Supercomputing, 7:9-50, May 1993.

H. Rong, Software Pipelining of Loop Nests, PhD thesis, Tsinghua University, Beijing, China, 2001.

J. Wang and G. R. Gao, Pipelining-dovetailing: A transformation to enhance software pipelining for nested loops, In Proc. of the $6^{th}$ Intl. Conf. on Compiler Construction, Lec. Notes in Comp. Sci., pp. 1-17, Linkoping, Sweden, Apr. 1996.

M. E. Wolf and M. S. Lam, A data locality optimizing algorithm, In Proc. of the ACM SIGPLAN '91 Conf. on Programming Language Design and Implementation, pp. 30-44, Toronto, Canada, Jun. 1991.

M. E. Wolf, D. E. Maydan and D.-K. Chen, Combining loop transformations considering caches and scheduling, In Proc. of the $29^{th}$ Ann. Intl. Symp. on Microarchitecture, pp. 274-286, Paris, Dec. 1996.

\* cited by examiner

```
int x[N_1][N_2], y[N_1][N_2];
L_1: for(i_1=0; i_1<N_1; i_1++) {
L_2:    for(i_2=0; i_2<N_2/2; i_2++) {
            y[i_1][i_2] = x[i_1][i_2];
        }
     }
```

FIG. 5 (prior art)

```
L₁: for (i₁=0; i₁<N₁; i₁++) {
        mov r35=r50
        mov r45=r55
        add r50[-1]=4*N₂, r50
        add r55[-1]=4*N₂, r55
    L₂: for (i₂=0; i₂<N₂/2; i₂++) {
            ld4 r40=[r35],4
            st4 [r45]=r40,4
        }
    }
```

FIG.6A

|  | | | mov r35=r50<br>add r49=4*$N_2$, r50 |
|---|---|---|---|
| Cycle 0 | | ld4 r42=[r37],4 | mov r46=r56<br>add r55=4*$N_2$, r56 |
| Cycle 1 | st4 [r48]=r43,4 | | |
|  | Stage3 ($l_w$ also $l_l$) | Stage2 ($f_w$) | Stage 1     Stage 0 |

FIG. 6B

```
        clrrrb;;
        r50 = start adress of array x
        r55 = start adress of array y      } 602
        LC = N1 - 1
        EC = 3 if N1 is odd, = 2 otherwise.
        mov pr.rot = 1<<16;;
        (p16) mov r35 = r50;;
        (p16) add r49 = 4 * N2, r50;;
        br.ctop next 1;;
next 1:                                                                          } 604
        (p17) mov r46 = r56       || (p16) mov r35 = r50;;
        (p17) add r55 = 4 * N2, r56  || (p16) add r49 = 4 * N2, r50;;
        br.ctop L1;;
                                                                                          606
L1:
        (p19) st4 [r48] = r43,4  || (p18) ld4 r42 = [r37],4  || (p17) mov r46 = r56    || (p16) mov r35 = r50;;
                                                              (p17) add r55 = 4 * N2, r56 || (p16) add r49 = 4 * N2, r50;;
        br.ctop next 2;;
next 2:
        (p19) st4 [r48] = r43,4  || (p18) ld4 r42 = [r37],4  || (p17) mov r46 = r56    || (p16) mov r35 = r50;;
                                                              (p17) add r55 = 4 * N2, r56 || (p16) add r49 = 4 * N2, r50;;
L2:     for (i2 = 1; i2 < N2 / 2; i2++) {
            (p19) ld4 r43 = [r38],4 || (p18) st4 [r47] = r42,4                          } 608
            (p19) st4 [r48] = r43,4 || (p18) ld4 r42 = [r37],4
        }
        br.ctop L1;; //  ◄─── 610
        }
                    (p18) st4 [r47] = r42,4 //  ◄─── 612
end:    // the end of the parallelized code.
```

FIG. 6C

```
L1: for (i1 = 0; i1 < N1; i1++ ) {
        add r35[-1] = 4 * N2, r35
        add r45[-1] = 4 * N2, r45
    L2:     For (i2 = 0; i2 < N2 / 2; i2++) {
                ld4 r40 = [r35], 4
                st4 [r45]=r40,4
            }
    }
```

FIG. 7A

| Cycle 0 | st4 [r48]=r43,4 | ld4 r42 = [r37], 4 | add r45 = 4 * $N_2$, r46 | add r34 = 4 * $N_2$, r35 |
|---|---|---|---|---|
| | Stage 3 ($l_n$, also $l_1$) | Stage 2 ($f_n$) | Stage 1 | Stage 0 |

FIG. 7B

```
       clrrrb;;
       r35 = start adress of array x
       r45 = start adress of array y                      } 702
       LC = N_1 - 1
       EC = 3 if N_1 is odd, = 2 otherwise.
       mov pr.rot = 1 <<16;;
       (p16) add r34 = 4 * N_2, r35;;                     
       br.ctop next 1;;                                   } 704
next 1:
       (p17) add r45 = 4 * N_2, r46 || (p16) add r34 = 4 * N_2, r35;;
       br.ctop L_1;;                                                                706
L_1:
       (p19) st4 [r48] = r43,4 || (p18) ld4 r42 = [r37],4 || (p17) add r45 = 4 * N_2, r46 || (p16) add r34 = 4 * N_2, r35;;
       br.ctop next 2;;
next 2:
       (p19) st4 [r48] = r43,4 || (p18) ld4 r42 = [r37],4 || (p17) add r45 = 4 * N_2, r46 || (p16) add r34 = 4 * N_2, r35;;
L_2:   for (i_2 = 1; i_2 < N_2 / 2; i_2++) {
              (p19) ld4 r43 = [r38],4 || (p18) st4 [r47] = r42,4      } 708
              (p19) st4 [r48] = r43,4 || (p18) ld4 r42 = [r37],4
       }
       br.ctop L_1;; //  ← 710
       }
                    (p18) st4 [r47] = r42,4 //  ← 712
```

FIG. 7C

```
// loop (x, y, N1, N2)
.section .text
.proc loop
.global          loop
loop:

/* Below is the common start in IA64 procedure, providing initialization of registers */
    alloc r2 = ar.pfs, 0,96,0,96
    mov r8 = r32     //start address of x
    mov r9 = r33     //start address of y
    adds r10 = -1, r34     //N1-1, the loop count for L1
    shr r11 = r35,1;;
    adds r11 = -2,r11;;   //N2/2-2, the loop count for L2. Correct when N2 is even. Should be adds r11=-1,r11
                          //when N2 is odd. Simplified here to keep our focus on code generation bellow.
    shl r14 = r35,2;;    //constant: 4 * N2
/*End of the part */

/* The code bellow constitutes an embodiment of the present invention */
    clrrrb;;
    mov r50 = r8;;       //prepare for live-in values
    mov r55 = r9;;       //prepare for live-in values
    mov ar.lc = r10
    tbit.z p6,p7 = r10,0;;
    (p6)mov ar.ec = 3    //lc is even (N1 is odd)
    (p7)mov ar.ec = 2    //lc is odd (N1 is even)
    mov pr.rot = 1 <<16;;
    (p16) nov r35 = r50;;
    (p16) add r49 = r14, r50;;
    br.ctop.sptk.many next1;;
next1:
    (p17) mov r46 = r56
    (p16) mov r35 = r50;;
    (p17) add r55 = r14, r56
    (p16) add r49 = r14, r50;;
    br.ctop.sptk.many L1;;
```

CONTINUES ON NEXT PAGE

FIG. 8

CONTINUED FROM PREVIOUS PAGE

L1:
    (p19) st4 [r48] = r43,4
    (p18) ld4 r42 = [r37],4
    (p17) mov r46 = r56
    (p16) mov r35 = r50;;
    (p17) add r55 = r14, r56
    (p16) add r49 = r14, r50;;
    br.ctop.sptk.many next2;;

next2:
    (p19) st4 [r48] = r43,4
    (p18) ld4 r42 = [r37],4
    (p17) mov r46 = r56
    (p16) mov r35 = r50;;
    (p17) add r55 = r14, r56
    (p16) add r49 = r14, r50;;

L2:
    mov r30 = ar.lc    //Save the lc of the L1
    mov ar.lc = r11
    //for (i2=1; i2 < N2/2; i2 ++) {

L2_body:
    (p19) ld4 r43 = [r38],4
    (p18) st4 [r47]=r42,4;;
    (p19) st4 [r48] = r43,4
    (p18) ld4 r42 = [r37],4
    // }
    br.cloop.sptk.many L2_body;;
    mov ar.lc = r30;;
    br.ctop.sptk.many L1;;

(p18) st4 [r47] = r42,4
/* end of our code generation */

/* bellow is the common end for IA64 procedure */
    mov.i ar.pfs=r2
    br.ret.sptk.many b0;
    .endp loop

FIG. 8

CONTINUED FROM PREVIOUS PAGE

L1:
    (p19) st4 [r48] = r43,4
    (p18) ld4 r42 = [r37],4
    (p17) add r45 = r14, r46
    (p16) add r34 = r14, r35;;
    br.ctop.sptk.many next2;;

next2:
    (p19) st4 [r48] = r43,4
    (p18) ld4 r42 = [r37],4
    (p17) add r45 = r14, r46
    (p16) add r34 = r14, r35;;

L2:
    mov r30 = ar.lc    //Save the lc of the L1
    mov ar.lc = r11
    //for (i2=1; i2 < N2/2; i2++) {

L2_body:
    (p19) ld4 r43 = [r38],4
    (p18) st4 [r47]=r42,4;;
    (p19) st4 [r48] = r43,4
    (p18) ld4 r42 = [r37],4
    // }
    br.cloop.sptk.many L2_body;;
    mov ar.lc = r30;;
    br.ctop.sptk.many L1;;
// }
drain:
    (p18) st4 [r47] = r42,4
/* end of our code generation */

/* bellow is the common end for IA64 procedure */
    mov.i ar.pfs=r2
    br.ret.sptk.many b0;
    .endp loop

EXECUTION OF CODE IN FIG. 8

| | |
|---|---|
| $LC = 2$; $EC = 3$; $(p16) = 1$; $r50 \rightarrow x_1$; $r55 \rightarrow y_1$ | for a 3x3 array : $N_1 = N_2 = 3$ |
| mov r35 = r50;; | $r35 \rightarrow x_1$ |
| add r49 = 12, r50;; | $r49 \rightarrow x_4$ |
| br.ctop next1;; | $LC = 1$; $EC = 3$; $(p16) = (p17) = 1$; $r36 \rightarrow x_1$; $r50 \rightarrow x_4$ |
| | $r51 \rightarrow x_1$; $r56 \rightarrow y_1$ |
| next1: | |
| mov r46 = r56     \|\| mov r35 = r50;; | $r46 \rightarrow y_1$; $r35 \rightarrow x_4$ |
| add r55 = 12, r56 \|\| add r49 = 12, r50;; | $r55 \rightarrow y_4$; $r49 \rightarrow x_7$ |
| br.ctop L1;; | $LC = 0$; $EC = 3$; $(p16) = (p17) = (p18) = 1$ |
| L1: | $r36 \rightarrow x_4$; $r37 \rightarrow x_1$; $r47 \rightarrow y_1$; $r50 \rightarrow x_7$; $r51 \rightarrow x_4$ |
| | $r52 \rightarrow x_1$; $r56 \rightarrow y_4$; $r57 \rightarrow y_1$ |
| ld4 r42 = [r37],4 \|\| mov r46=r56 \|\| mov r35 = r50;; | $r42 = x_1$; $r37 \rightarrow x_2$; $r46 \rightarrow y_4$; $r35 \rightarrow x_7$ |
| add r55 = 12, r56 \|\| add r49 = 12, r50;; | $r55 \rightarrow y_7$; $r49 \rightarrow \infty$ |
| br.ctop next2;; | $LC = 0$; $EC=2$; $(p16) = 0$; $(p17-19) = 1$; $r43 = x_1$ |
| next2: | $r37 \rightarrow x_4$; $r38 \rightarrow x_2$; $r36 \rightarrow x_7$; $r47 \rightarrow y_4$; $r48 \rightarrow y_1$ |
| | $r56 \rightarrow y_7$; $r58 \rightarrow y_1$; $r57 \rightarrow y_4$; $r53 \rightarrow x_1$ |
| | $r52 \rightarrow x_4$; $r51 \rightarrow x_7$ |
| st4 [r48] = r43,4 \|\| ld4 r42 = [r37],4 \|\| mov r46 = r56;; | $y_1 = x_1$; $r48 \rightarrow y_2$; $r42 = x_4$; $r37 \rightarrow x_5$; $r46 \rightarrow y_7$ |
| add r55 = 12, r56;; | $r55 \rightarrow \infty$ |
| L2: for ($i_2 = 1$; $i_2 < 1.5$; $i_2$++) { | |
| ld4 r43 = [r38],4 \|\| st4 [r47] = r42,4;; | $r43 = x_2$; $r38 \rightarrow x_3$; $y_4 = x_4$; $r47 \rightarrow y_5$ |
| st4 [r48] = r43,4 \|\| ld4 r42 = [r37],4;; } | $y_2 = x_2$; $r48 \rightarrow y_3$; $r42 = x_5$; $r37 \rightarrow x_6$ |
| br.ctop L1;; | $LC = 0$; $EC = 1$; $(p16-17) = 0$; $(p18-20) = 1$; $r43 = x_5$; $r44 = x_2$ |
| L1: | $r50 \rightarrow \infty$; $r52 \rightarrow x_7$; $r53 \rightarrow x_4$; $r54 \rightarrow x_1$; $r58 \rightarrow y_4$; $r59 \rightarrow y_1$ |
| | $r49 \rightarrow y_3$; $r38 \rightarrow x_6$; $r48 \rightarrow y_5$; $r39 \rightarrow x_3$; $r44 \rightarrow x_2$ |
| | $r56 \rightarrow \infty$; $r47 \rightarrow y_7$; $r37 \rightarrow x_7$ |
| st4 [r48]=r43,4 \|\| ld4 r42 = [r37],4 | $y_5 = x_5$; $r48 \rightarrow y_6$; $r42 = x_7$; $r37 \rightarrow x_8$ |
| br.ctop next2;; | $LC = 0$; $EC = 0$; $(p16-18) = 0$; $(p19-21) = 1$; $r43 = x_7$; |
| | $r38 \rightarrow x_8$; $r49 \rightarrow y_6$; $r48 \rightarrow y_7$ |
| next2: | etc. |
| st4 [r48]=r43,4;; | $y_7 = x_7$; $r48 \rightarrow y_8$ |
| L2: for ($i_2 = 1$; $i_2 < 1.5$; $i_2$++) { | |
| ld4 r43 = [r38],4;; st4 [r48] = r43,4;; } | $r43 = x_8$; $r38 \rightarrow x_9$; THEN $y_8 = x_8$; $r48 \rightarrow y_9$ |
| br.ctop L1;; | $LC = EC = 0$, thus branch not taken |
| end: | |

FIG. 11

EXECUTION OF CODE IN FIG. 9

| | |
|---|---|
| $LC = 2; EC = 3; (p16) = 1; r35 \rightarrow x_1; r45 \rightarrow y_1$ | for a 3x3 array : $N_1 = N_2 = 3$ |
| add r34 = 12, r35;; | $r34 \rightarrow x_4$ |
| br.ctop next1;;<br>next1:<br>add r45 = 12, r46 \|\| add r34 = 12, r35;; | $LC = 1; EC = 3; (p16) = (p17) = 1; r35 \rightarrow x_4; r36 \rightarrow x_1; r46 \rightarrow y_1$<br>$r45 \rightarrow y_4; r34 \rightarrow x_7$ |
| br.ctop L1;;<br>L1:<br>ld4 r42 = [r37],4 \|\| add r45 = 12, r46 \|\| add r34 = 12, r35 | $LC = 0; EC = 3; (p16\text{-}18) = 1; r35 \rightarrow x_7; r36 \rightarrow x_4; r37 \rightarrow x_1$<br>$r46 \rightarrow y_4; r47 \rightarrow y_1;$<br>$r42 = x_1; r37 \rightarrow x_2; r45 \rightarrow y_7; r34 \rightarrow \infty$ |
| br.ctop next2;;<br><br>next2:<br>st [r48] = r43,4 \|\| ld4 r42 = [r37],4 \|\|add r45 = 12, r46;;<br>L2: for ($i_2 = 1; i_2 < 1.5; i_2$++) {<br>ld4 r43 = [r38],4 \|\| st4 [r47] = r42,4;;<br>st4 [r48] = r43,4 \|\| ld4 r42 = [r37],4;; } | $LC = 0; EC=2; (p16) = 0; (p17\text{-}19) = 1; r43 = x_1; r36 \rightarrow x_7$<br>$r37 \rightarrow x_4$<br>$r35 \rightarrow \infty; r46 \rightarrow y_7; r48 \rightarrow y_1; r38 \rightarrow x_2; r47 \rightarrow y_4$<br>$y_1 = x_1; r48 \rightarrow y_2; r42 = x_4; r37 \rightarrow x_5; r45 \rightarrow \infty$<br>$r43 = x_2; r38 \rightarrow x_3; y_4 = x_4; r47 \rightarrow y_5$<br>$y_2 = x_2; r48 \rightarrow y_3; r42 = x_5; r37 \rightarrow x_6$ |
| br.ctop L1;;<br><br>L1:<br>st4 [r48]=r43,4 \|\| ld4 r42 = [r37],4;; | $LC = 0; EC = 1; (p16\text{-}17) = 0; (p18\text{-}20) = 1; r43 = x_5; r44 = x_2$<br>$r36 \rightarrow \infty; r38 \rightarrow x_6$<br>$r48 \rightarrow y_5; r49 \rightarrow y_3; r37 \rightarrow x_7; r47 \rightarrow y_7$<br>$y_5 = x_5; r48 \rightarrow y_6; r42 = x_7; r37 \rightarrow x_8$ |
| br.ctop next2;;<br><br>next2:<br><br><br>st4 [r48]=r43,4;;<br>L2: for ($i_2 = 1; i_2 < 1.5; i_2$++) {<br>ld4 r43 = [r38],4;;<br>st4 [r48] = r43,4;; } | $LC = 0; EC = 0; (p16\text{-}18) = 0; (p19\text{-}21) = 1; r43 = x_7$<br>$r44 = x_5; r45 = x_2$<br>$r38 \rightarrow x_8; r49 \rightarrow y_6; r48 \rightarrow y_7; r50 \rightarrow y_3$<br>$r40 \rightarrow x_3; r39 \rightarrow x_6$<br>$y_7 = x_7; r48 \rightarrow y_8$<br><br>$r43 = x_8; r38 \rightarrow x_9$<br>$y_8 = x_8; r48 \rightarrow y_9;$ |
| br.ctop L1;; | $LC = 0; EC = 0;$ loop branch not taken; $(p16\text{-}18) = 0$<br>registers not rotated |

FIG. 16A
```
⎡ L₁: for (i₁ = 0; i₁ < N₁; i₁ ++) {
│ L₂:      for (i₂ = 0; i₂ < N₂; i₂ ++) {
│            a: U[i₁+1][i₂] = V[i₁][i₂] + U[i₁][i₂];
│            b: V[i₁][i₂+1] = U[i₁+1][i₂];
│          }
⎣        }
```

FIG. 16B

|  | 0 | 1 | 2 | 3 | 4 | 5 ... | $i_1$ |
|---|---|---|---|---|---|---|---|
| 0 | a(0,0) | | | | | | |
| 1 | b(0,0) | a(1,0) | | | | | |
| 2 | a(0,1) | b(1,0) | a(2,0) | | | | |
| 3 | b(0,1) | a(1,1) | b(2,0) | a(3,0) | | | |
| 4 | a(0,2) | b(1,1) | a(2,1) | b(3,0) | a(4,0) | | |
| 5 | b(0,2) | a(1,2) | b(2,1) | a(3,1) | b(4,0) | a(5,0) | |
| 6 | | b(1,2) | a(2,2) | b(3,1) | a(4,1) | b(5,0) | |
| 7 | | | b(2,2) | a(3,2) | b(4,1) | a(5,1) | |
| 8 | | | | b(3,2) | a(4,2) | b(5,1) | |
| 9 | | | | | b(4,2) | a(5,2) | |
| 10 | | | | | | b(5,2) | |

Cycle

Group 0, Group 1, Group 2

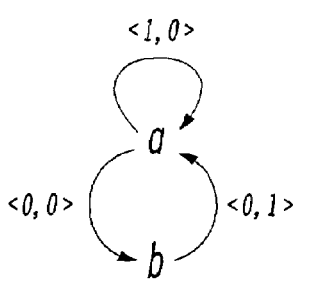

FIG. 16C

FIG. 16D
```
SWP (i₁):
    Initialization related with thread starting.
    Wait for signal s(i₁ - 1, 0)
    a(i₁, 0)
    b(i₁, 0) a(i₁+1, 0)
    signal s(i₁+1, 0)
    L₂': for (i₂ = 1; i₂ < N₂; i₂ ++) {
        Wait for signal s(i₁ - 1, i₂)
        a(i₁, i₂) b(i₁+1, i₂-1)
        b(i₁, i₂) a(i₁+1, i₂)
        signal s(i₁+1, i₂)
    }
    b(i₁+1, N₂-1)
    Cleanup code related with thread finishing
```

METHODS AND PRODUCTS FOR PROCESSING LOOP NESTS

RELATED APPLICATIONS

This application claims the benefit of the filing dates of U.S. Provisional Patent Application No. 60/504,043 to Rong et al. entitled METHOD FOR GENERATING SOFTWARE PIPELINED CODE FOR LOOP NESTS filed on Sep. 19, 2003 and of U.S. Provisional Patent Application No. 60/507,043 to Rong et al. entitled SOFTWARE PIPELINING OUTER LOOP OF A LOOP NEST FOR MULTITHREADING filed on Sep. 29, 2003, the contents of which are incorporated herein by reference.

FIELD OF THE INVENTION

The present invention relates to the field of computer science and, more particularly, to methods for processing a software kernel of instructions representing a loop nest.

BACKGROUND OF THE INVENTION

A compiler translates ("compiles") a computer program written in a high level programming source code (e.g., C++) into object code for execution by a computer processor. Source code often contains numerous loops, which are software structures that perform repeated operations using a single set of instructions. Typically, computer processors spend a majority of their time executing instructions within loops.

There is an ever present desire for improved methods and products to compile source code that offer improvements in computer processor execution time. Techniques to improve the execution time associated with processing instructions within loops include increasing instruction level parallelism. Software pipelining is one method of increasing instruction level parallelism. Software pipelining restructures loops of a computer program such that instructions from various iterations of a loop are executed by a computer processor in parallel (i.e., concurrently). This method typically results in significant improvements in execution time.

Many computer programs include loops that are contained within the body of other loop, i.e., loop nests. A loop nest may have an even greater impact on execution time than a single loop. A loop nest is typically processed by first software pipelining the innermost loop and, thus, software pipelined parallelism in outer loops, which could possibly offer greater instruction level parallelism, is largely ignored. Accordingly, there is a need for methods and products for processing loop nests that take advantage of instruction level parallelism for outer loops. The present invention addresses this need among others.

SUMMARY OF THE INVENTION

The present invention is embodied in methods and products for processing a software kernel of instructions. The software kernel has stages representing a loop nest. The software kernel is processed by (a) partitioning iterations of an outermost loop into groups with each group representing iterations of the outermost loop, (b) running the software kernel and rotating a register file for each stage of the software kernel preceding an innermost loop to generate code to prepare for filling and executing instructions in software pipelines for a current group, (c) running the software kernel for each stage of the software kernel in the innermost loop to generate code to fill the software pipelines for the current group and drain the software pipelines for a previous group with the register file being rotated after at least one run of the software kernel for the innermost loop, and (d) repeatedly running the software kernel to unroll inner loops to generate code to further fill the software pipelines for the current group. In an exemplary embodiment, steps c and d are repeated until a last outermost loop iteration has been initiated. In addition, the software kernel is run to generate code to drain the software pipelines for at least one unfinished group.

In one aspect of the present invention, the groups are all processed by the same processor. In another aspect of the present invention, the groups are assigned to multiple processors in a multi-processor environment.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Included in the drawings are the following figures:

FIG. 5 is a known C++ program for a loop nest;

FIG. 6A shows an exemplary intermediate representation of the program in FIG. 5 (having combined C++ code and IA-64 assembly code) in accordance with the present invention;

FIG. 6B shows an exemplary kernel for the program in FIG. 5 that corresponds to the intermediate representation in FIG. 6A in accordance with the present invention;

FIG. 6C shows exemplary parallelized IA-64 assembly code for the program in FIG. 5 in accordance with the present invention;

FIG. 7A shows an alternate exemplary intermediate representation of the program in FIG. 5 (having combined C++ code and IA-64 assembly code) in accordance with the present invention;

FIG. 7B shows an alternative exemplary kernel for the program in FIG. 5 that corresponds to the intermediate representation in FIG. 7A in accordance with the present invention;

FIG. 7C shows an alternate exemplary parallelized IA-64 assembly code for the program in FIG. 5, in accordance with the present invention;

FIG. 8 is the complete IA-64 assembly code corresponding to the embodiment of the invention illustrated in FIGS. 6A-C in accordance with the present invention;

FIG. 10 is pseudo-code illustrating a step-by-step analysis of the unrolled execution of the program in FIGS. 6A-C for a 3×3 array in accordance with the present invention;

FIG. 11 is pseudo-code illustrating a step-by-step analysis of the unrolled execution of the program in FIGS. 7A-C for a 3×3 array in accordance with the present invention;

FIG. 16A is an illustration of a perfect loop next for use in explaining an aspect of the present invention;

FIG. 16B is a graphical depiction of a running scheme of the perfect loop nest of FIG. 16A after software pipelining the outermost loop in accordance with the present invention;

FIG. 16C is a dependence graph for the perfect loop nest of FIG. 16A; and

FIG. 16D is an illustration of a software pipelined thread for the perfect loop nest of FIG. 16A in accordance with the present invention.

DETAILED DESCRIPTION OF THE INVENTION

Figure 1:
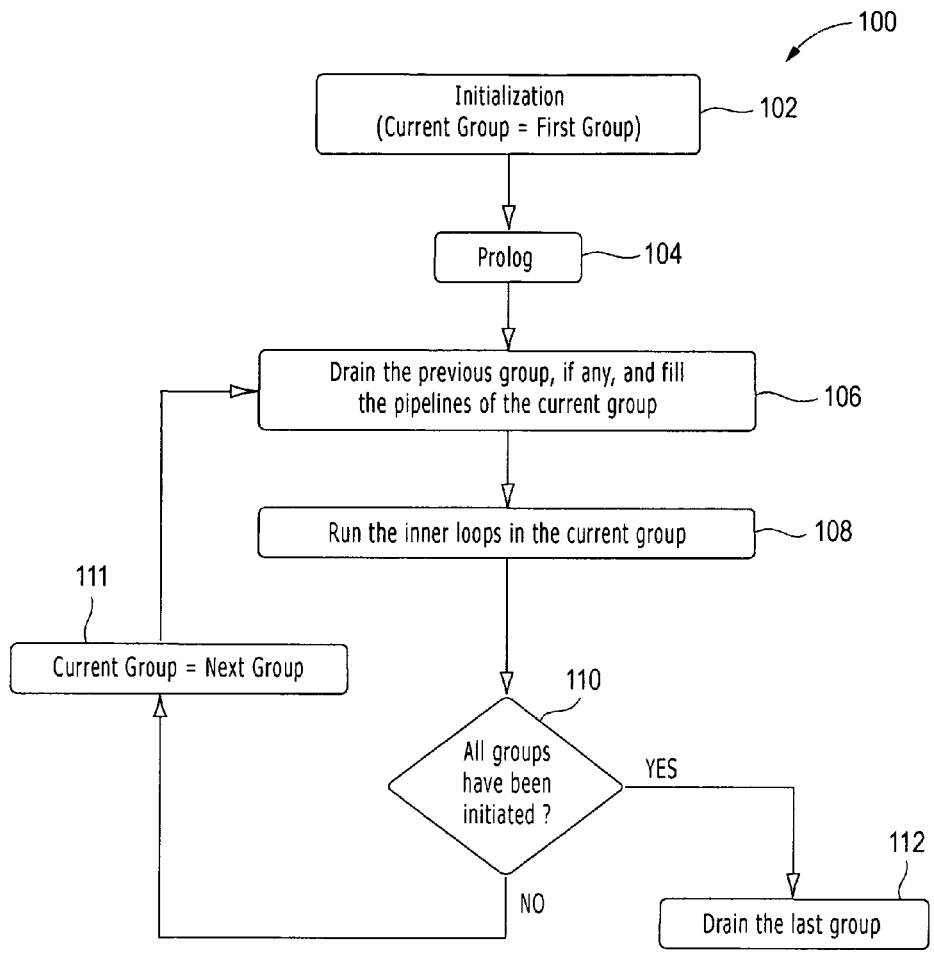
FIG. 1 is a flowchart depicting exemplary processing steps in accordance with one aspect of the present invention.

FIG. 1 is a flowchart 100 including steps for providing a general overview of one aspect of the present invention. The steps are performed by a compiler that translates ("compiles") source code including a loop nest into object code for execution by a computer processor. During translation, the compiler "runs" a software kernel of "low-level" code (e.g., assembly/machine instructions/operations) to generate corresponding object code. During a "run," the compiler takes the software kernel as a template to generate object code, rather than executing the low-level code in the kernel. For ease of description, this translation process may be described simply as a run of the software kernel or running the software kernel, and the object code may be referred to herein simply as "code." In an exemplary embodiment, the loop nest includes an outermost loop and at least one inner loop within the outermost loop. The at least one inner loop includes an innermost loop. In addition, the at least one inner loop may include one or more other loops. Each loop is configured to perform multiple iterations of one or more instructions.

At block 102, the code generation process is initialized. In an exemplary embodiment, during initialization, iterations of an outermost loop are partitioned into groups, with iterations in the same group meant for execution in parallel. The partitioning of iterations of the outermost loop into groups may be a determination of the number of iterations of the outermost loop to be assigned to each group. At block 104, commands contained in a prolog are executed in preparation for filling and executing code in software pipelines for the iteration groups. At block 106, software pipelines are concurrently drained for a previous group (if any) and filled for a current group. By overlapping the draining and filling of the software pipelines, a compact and efficient overlapping is achieved, which increased processing efficiency for the loop nest. In a first run, the current group is the first group and, thus, there is no previous group to drain from the software pipelines. At block 108, the parallelized code for the inner loops of the current iteration group of the loop nest is run and the commands of the inner loops therein are executed. At block 110 a decision is performed regarding whether all the groups have been initiated. If all groups have not been initiated, at block 111, a next group becomes the current group and processing resumes at block 106 where the code in the software pipeline is drained for the previous group and is filled with code for the current group. If all groups have been initiated, processing proceeds at block 112. At block 112, the software pipeline of the last group is drained. In addition, unfinished groups may also be drained.

Figure 2:
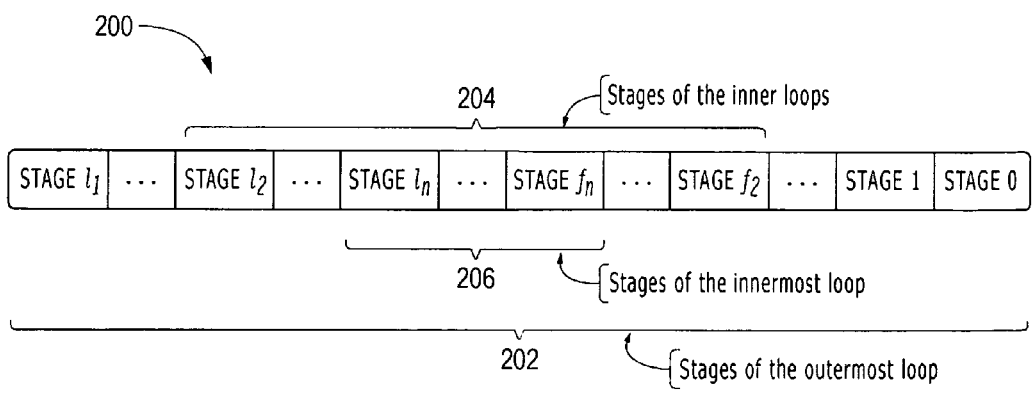
FIG. 2 is an illustration of a kernel according to the present invention.

FIG. 2 depicts an exemplary software kernel 200. The software kernel 200 includes a plurality of stages representing a loop nest. The loop nest includes an outermost loop 202, one or more inner loops 204, and an innermost loop 206. The inner loops 204 are within the outermost loop 202. The one or more inner loops 204 may include only the innermost loop 206 or one or more loops in addition to the innermost loop 206. In an exemplary embodiment, the loop level for the outermost loop is selected based on a good potential for instruction parallelism and data reuse optimization, and is not necessarily the main loop of a computer program. The selected outermost loop may then be software pipelined based on the resource constraints of the underlying processor and the "dependence constraints" in the selected outermost loop. The result of the software pipelining is a software kernel such as illustrated in FIG. 2. Through this process, the outermost loop is optimally parallelized and, furthermore, the filling and draining of the software pipelines are inherently overlapped compactly.

The stages of the software kernel 200 in FIG. 2 are named stage $0, 1, \ldots, l_1$ from right to left. Stages $0$ and $l_1$ represent the first and last stages, respectively, of the outermost loop 202. Stages $f_2$ and $l_2$ represent the first and last stages, respectively, of the inner loops 204. Stages $f_n$ and $l_n$ represent the first and last stages, respectively, of the innermost loop 206. The number of stages, $S_n$, containing operations of the innermost loop is equal to $l_n-f_n+1$.

Figure 3:
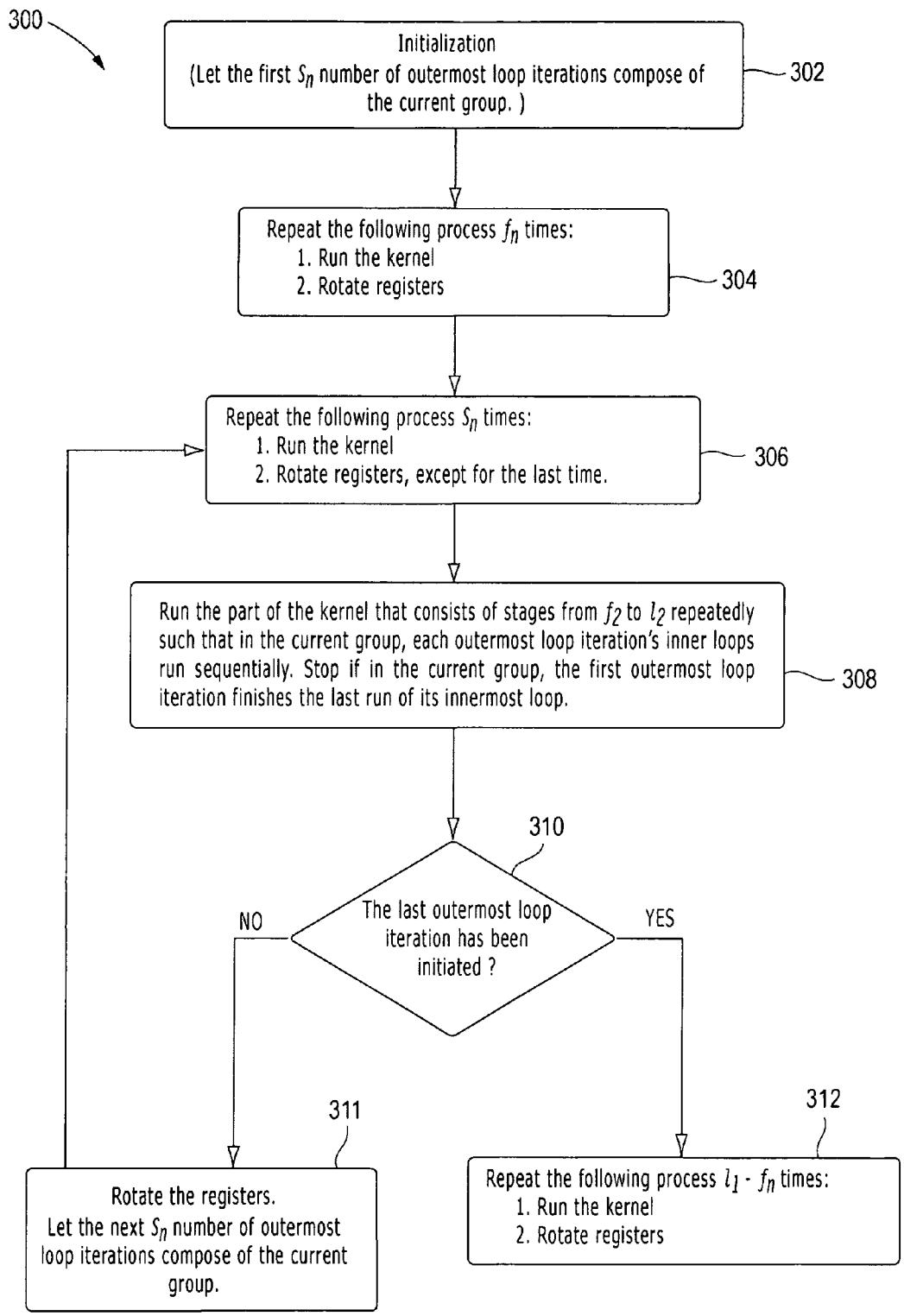
FIG. 3 is a flowchart depicting the exemplary processing steps of FIG. 1 in further detail.

FIG. 3 is a flowchart 300 including steps for processing the software kernel 200 of FIG. 2 in accordance with one aspect of the present invention. At block 302, initialization is performed as described above with reference to block 102 (FIG. 1), with iterations of the outermost loop 202 being partitioned into groups. As described above, the step of partitioning iterations of the outermost loop into groups may be a determination of the number of iterations of the outermost loop to be assigned to each group. In an exemplary embodiment, the first group of outermost loop iterations to be executed is composed of the first $S_n$ number of outermost loop iterations, where $S_n$ is the number of stages of the innermost loop 206. Similarly, the second group of outermost loop iterations to be executed is composed of the next $S_n$ number of outermost loop iterations, and so on.

At block 304, the prolog portion of the compilation process is performed to generate code in preparation for filling and executing instructions in software pipelines for a current group. During the prolog portion, the kernel 200 is run one or more times with each run followed by a rotation of one or more register files. In an exemplary embodiment, the kernel 200 is run and the one or more register files are rotated once for every stage preceding the first stage of the innermost loop, i.e., $f_n$ times.

The one or more register files may include one or more rotating register files or one or more other types of register files that are filled and drained such that they function as rotating register files. Exemplary rotating register files are present in the IA-64 Architecture produced by Intel Corporation of Santa Clara, Calif., USA. In computer architectures with rotating registers files, register file rotation is performed by executing a corresponding rotate register command. In computer architectures without rotating register files, the rotate register command may be equivalently replaced with one or more commands that move values between appropriate registers. The one or more rotating register files may include one or more of an integer rotating register file, a floating-point rotating register file, or a predicate rotating register file. The selection and use of register files in accordance with the present invention will be understood by one of skill in the art from the description herein.

At block 306, the software kernel is run for each stage in the innermost loop 206 of the software kernel (i.e., $S_n$ times) to generate code to drain the software pipelines for a previous group and fill the software pipelines for a subsequent group (i.e., the current group). In an exemplary embodiment, each run of the software kernel creates an instance of the software kernel. In an exemplary embodiment, at least one of the one or more register files is rotated after each run of the software kernel except for the last run (i.e., $S_n-1$ times).

At block 308, the software kernel is repeatedly run to unroll the at least one inner loop 204 to generate code to further fill the software pipelines for the current group. In an exemplary embodiment, the at least one inner loop 204 is unrolled by repeatedly creating instances of the software kernel. In an exemplary embodiment, the at least one inner loop 204 is unrolled such that the inner loops of each outermost loop iteration in the current group are run sequentially.

At block 310, a decision is made regarding the current iteration of the outermost loop 202. If the last outermost loop iteration has not been initiated, processing proceeds to block 306 with the steps of blocks 306 and 308 repeating until the last outermost loop iteration is initiated. If the last outermost loop iteration has been initiated, processing proceeds to block 312. In an exemplary embodiment, a loop counter indicates the number of loops remaining. The loop counter is configured to equal a predefined value (e.g. zero "0") when the last outermost loop iteration is to be initiated. If there are iterations remaining, then the step of block 311 rotates the at least one register file and assigns the next $S_n$ number of iterations of the outermost loop as the current group.

The rotation of the register files may be accomplished using dynamic register renaming. The inner loops 204, however, may be unrolled using static register renaming through direct register access. Thus, the repeating process of steps 306 and 308 may be characterized by interleaved dynamic register renaming through rotating registers and static register renaming through direct register access.

At block 312, the software kernel is run to drain the software pipelines for the last group, during which any other unfinished groups may also be drained. In an exemplary embodiment, the software kernel is run and the registers are rotated for each stage after the first stage of the innermost loop, i.e., $l_1-f_n$ times, to drain the software pipeline for the last group.

In alternative exemplary embodiments, the step in block 304 may be repeated $f_n-1$ times instead of $f_n$ times, with minor changes made in one or more of the steps of blocks 308 and 312. In addition, a reduction in code size may be achieved by implementing one or more of the steps of blocks 304, 306, and 312 as compact loops. Also, code size may be reduced by reusing the step of block 306 to realize the whole or at least part of the function of the step of block 312.

Figure 4:
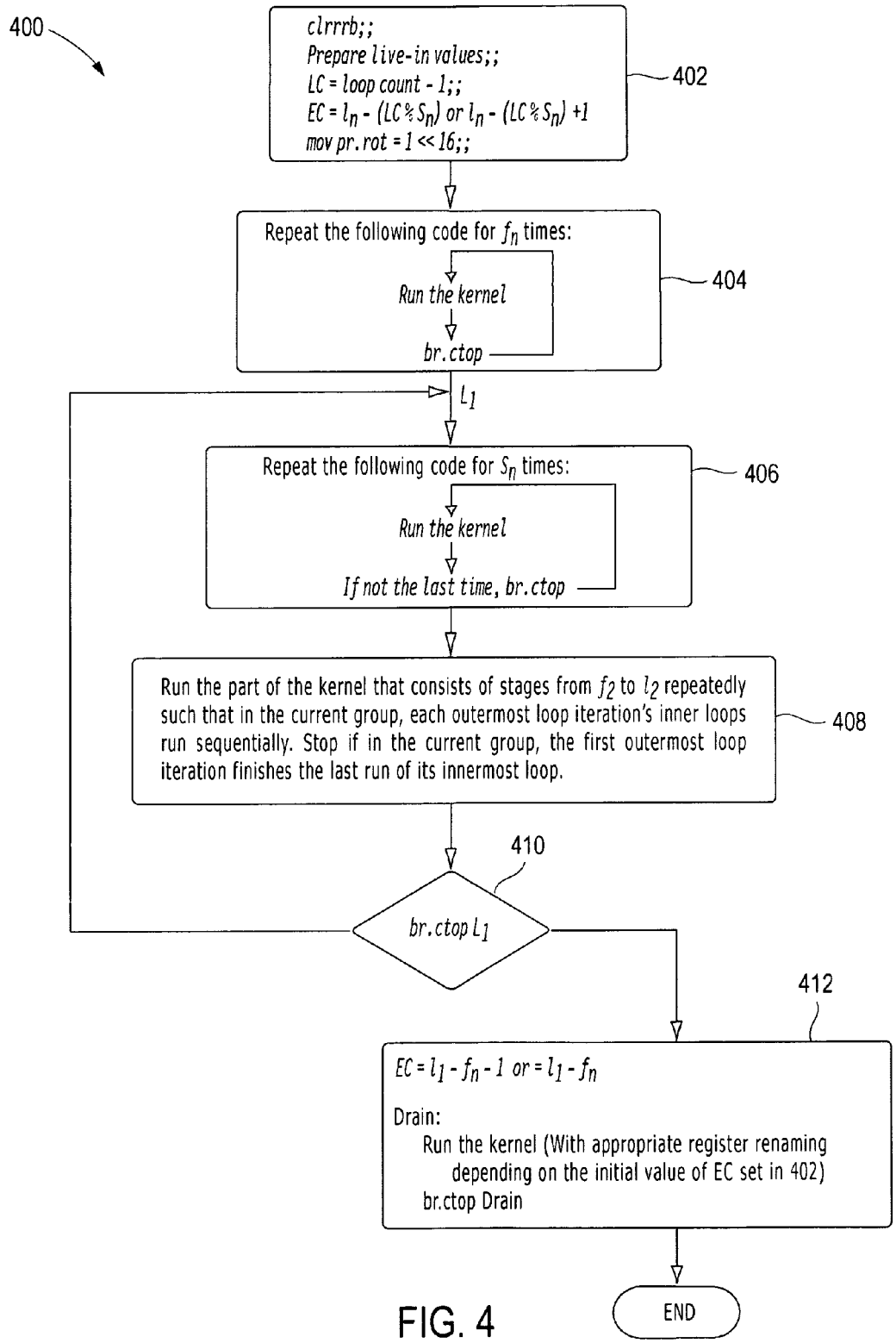
FIG. 4 is a flowchart depicting the exemplary processing steps of FIGS. 1 and 3 as applied to an IA-64 Computer Architecture by Intel.

FIG. 4 is a flowchart 400 including steps for processing the software kernel 200 of FIG. 2 using Intel's IA-64 computer architecture in accordance with one aspect of the present invention. Although the embodiment in FIG. 4 is specific to the IA-64 architecture, the principles presented therein may apply to other instruction-level parallelism enabled processors as well.

At block 402, initialization is performed for the IA-64 computer architecture with iterations of the outermost loop 202 being partitioned into groups. Initialization code for the IA-64 implementation is depicted within block 402, which will be understood by one of skill in the art. Generally, the IA-64 rotating register base (rrb) is cleared (cir) using a clear command (clrrrb), live-in values for the program (for example, the start addresses for variables, arrays, and constants used in the program) are prepared, a loop count (LC) register and an epilog count (EC) register are set, and a predicate rotating register (e.g., predicate rotating register p16 in IA-64) is set to "1." The loop count (LC) and epilog count (EC) registers are initialized such that both are set to terminate loop branching (e.g., the branch to L1 in the step of block 410 below) once all the outermost loop iterations have been initiated. Pursuant to the well-known behavior of the "br.c-top" register rotation command in IA-64 assembly code, equations 1 and 2 were derived as the appropriate values of LC and EC (where the value "loop count" is equivalent to the number of iterations specified for the outermost loop in the loop nest) that will produce desired results.

$$LC = \text{loop count} - 1 \quad (1)$$

$$EC = l_n - (LC \% S_n) \text{ or } EC = l_n - (LC \% S_n) + 1 \quad (2)$$

where "%" indicates modulo division, $S_n$ is the number of stages in the innermost loop, and $l_n$ are the number of stages prior to the last stage of the innermost loop for a software kernel such as illustrated in FIG. 2.

At block 404, a prolog portion of the compiler is performed. In the prolog, the software kernel is run and the registers are subsequently rotated for $f_n$ times, where $f_n$ is the number of kernel stages prior to the first stage of the innermost loop 206 for a software kernel such as illustrated in FIG. 2. In an exemplary embodiment, register file rotation is accomplished using the "br.ctop" register rotation command.

At block 406, the software pipelines for the previous group (if any) are drained and the software pipelines for the current group are filled. In an exemplary embodiment, this is performed by running the software kernel $S_n$ times and rotating the rotating register files after each run except for the last run. Register file rotation may be accomplished using the "br.ctop" register rotation command.

At block 408, the software kernel is repeatedly run to unroll the stages of the kernel that correspond to operations of the inner loops (e.g., stages $f_2$ to $l_2$) such that each iteration's inner loops are run sequentially. In an exemplary embodiment, the software kernel is repeatedly run until the first outermost loop iteration in the current group finishes the last run of its innermost loop.

At block 410, a decision is made regarding whether all the groups have been initiated. In an exemplary embodiment, this decision is inherently made by the values of LC and EC that are passed to it, and is implemented by the "br.ctop L1" command. Consequently, it is desirable to set proper LC and EC starting conditions in the step of block 402 in order to achieve proper program execution. A well-known behavior of the IA-64 command "br.ctop" is that a branch will not be taken when LC=0 and EC=0,1. More specifically, when LC=EC=0, the branch will not be taken nor will the register files be rotated. When LC=0 and EC=1, however, the branch will not be taken, but the register files will be rotated a final time.

For embodiments where EC=$l_n$-(LC%$S_n$), if all the groups have been initiated, LC=EC=0. In this case, processing proceeds at block 412 (i.e., the L1 control branch is not taken). If groups still remain to be initiated, then the register files are rotated (e.g., in accordance with br.ctop) and processing proceeds at block 406 (i.e., the L1 control branch is taken). Thus, the steps of blocks 406 and 408 are repeated until all groups have been initiated. For embodiments where EC=$l_n$-(LC%$S_n$)+1, LC=0 and EC=1 when the step of block 410 is reached with all the groups initiated. This causes the instruction "br.ctop L1" in the step of block 410 to rotate the register files. Due to the presence of a final register rotation depending on the equation selected for EC, it is desirable to appropriately rename the register files in the step of block 412 correspondingly to assure proper software pipeline draining.

An example of appropriate register file renaming is now described with reference to FIG. 6C. The code in FIG. 6C illustrates exemplary assembly code for a C++ programming language loop nest. In the step identified by numeral 612 (which corresponds to the step of block 412 described below) draining of the software pipelines is performed using the draining operation "(p18) st4 [r47]=r42,4", which corresponds to an initial EC value of "$l_n$-(LC%$S_n$)" set in the step identified by numeral 602 (which corresponds to the step of block 402). If the step identified by numeral 602 initializes the EC value as "$l_n$-(LC%$S_n$)+1", however, then the draining of the software pipelines may be desirably set as "(p19) st4 [r48]=r43,4". Those of skill in the art will understand from the description herein that the registers in the draining step identified by numeral 612 may generally be set to the next highest registers, respectively, to account for an additional register rotation in the step identified by numeral 610 when EC is initialized as "$l_n$-(LC%$S_n$)+1" in the step identified by numeral 602.

Referring back to FIG. 4, at block 412, the software kernel is run and the software pipelines are drained. Those skilled in the art will understand that the register files in the draining step of block 412 may generally be desirably set to the next highest register, respectively, to account for the additional register rotation of the step of block 410 when EC is initialized as $l_n$-(LC%$S_n$)+1 in the step of block 402.

Generally, the desired results are that when LC=EC=0, all outermost loop iterations have been issued, and no additional iterations have been illegally issued, and, so processing transfers to the step of block 412 to drain the issued, yet unfinished, outermost loop iterations. In an exemplary embodiment, the last group of iterations are drained by running the kernel and rotating the register files for $l_1$-$f_n$ times, which corresponds to the number of kernel stages after the first stage ($f_n$) of the innermost loop 206. As shown in the IA-64 implementation of FIG. 4, the step of block 412 may also reset EC to $l_1$-$f_n$ to achieve the same result with the only difference being an additional rotation of the register files in the final draining step, as described above. LC remains 0 as the kernel is run, with subsequent register rotation, until EC=0, signaling the complete draining of the last group. At this point, the compiling may be deemed complete.

In an alternative exemplary embodiment, the loop count for the loop in the step of block 412 may be small enough so that br.ctop dynamic register rotation may be replaced by an unrolled loop with static register renaming.

In an alternative exemplary embodiment, static or rotating registers may be selected for use based on the lifetimes of the variables being used. Since the iterations of the outermost loop are run in parallel, in accordance with the present invention, a variable in the program may have multiple instances (e.g., one instance in each of the outermost loop iterations being run). When the lifetime of a variable instance in an iteration overlaps with the lifetime of another instance of the same variable in another iteration, rotating registers may be used. In such a case, the variable may be allocated to a series of rotating registers, where, by register renaming, each variable instance accesses a unique register, thereby avoiding faults in the memory and program execution. If an overlap of variable instances does not occur, then a static or rotating register may be used to represent that variable.

FIG. 5 depicts an exemplary C++ program featuring a nested loop structure that is useful in describing the present invention. The first line of the code declares two two-dimensional arrays x and y. The subsequent "for loops" serve to transfer the values in the x-array corresponding to rows 0 to $N_1$-1 and columns 0 to $N_2$/2-1 to the same locations in the y-array. The program assumes that desired values have been preloaded into the x-array prior to the transfer function of the nested loop structure.

FIGS. 6-9 are exemplary embodiments of software parallelized code corresponding to the C++ code in FIG. 5 that serve to illustrate the code generation technique of the present invention. It should be noted that these examples are simplified, and do not take performance issues into consideration (e.g., preprocessing and scheduling phases have not taken place). The examples generally serve to illustrate the generation of parallelized code from a given kernel. FIGS. 6A-C show one embodiment, while FIGS. 7A-C show an alternate embodiment with more compact code. Generally, the operation "add ry[−1]= . . . ,ry" in FIGS. 7A-C serves as a replacement for operations "mov ry=rx" and "add rx[−1]= . . . ,rx" in FIGS. 6A-C. Here, ry is a memory pointing register for a value in either array x or y in an iteration, where ry[−1] corresponds to the memory pointing register for the value in the next outermost loop iteration.

FIGS. 6A and 7A are intermediate representations of the code after preprocessing, and are generally not executable assembly code for C++. FIGS. 6C and 7C, however, represent parallelized executable code, created using the kernels in FIGS. 6B and 7B, respectively. Both examples set EC as $EC=1_n-(LC\%S_n)$, and prepare live-in values by transferring the start addresses of arrays x and y into the appropriate rotating registers. Furthermore, steps identified with numerals 602-612 in FIG. 6 and steps identified with numerals 702-712 in FIG.7 each correspond to respective steps 402-412 in the flowchart 400 of FIG. 4. In the portions identified with numerals 612 and 712 of the exemplary programs, the draining is not implemented using a loop since the kernel in this simplified example need only run once.

Figure 9:
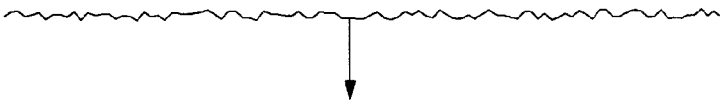
FIG. 9 is the complete IA-64 assembly code corresponding to the embodiment of the invention illustrated in FIGS. 7A-C in accordance with the present invention.

FIGS. 8 and 9 show fully compiled IA-64 computer architecture code corresponding to the exemplary programs in FIGS. 6A-6C and 7A-7C, respectively.

Those skilled in the art will be able to understand the code in FIGS. 6A-9 in verifying properly parallelized execution of the C++ program of FIG. 5. To further aid those skilled in the art, FIGS. 10 and 11 provide a step-by-step analysis of the unrolled execution of the programs in FIGS. 6A-C, 8 and FIGS. 7A-C, 9, respectively. The code therein is executed for 3×3 arrays x=[x1,x2,x3; x4,x5,x6; x7,x8,x9] and y=[y1,y2,y3; y4,y5,y6; y7,y8,y9]. Value assignments into a register are designated with an equal sign "=", memory pointing register assignments are designated with an arrow "→", array value transfer commands are designated by an equal sign "=" (for example, x1=y1 signifies transfer of the first value in the array x to the first value in the array y), a parallel bar sign "||" indicates instructions being run in parallel, and an infinity sign "∞" signifies an unknown value.

Figure 12:
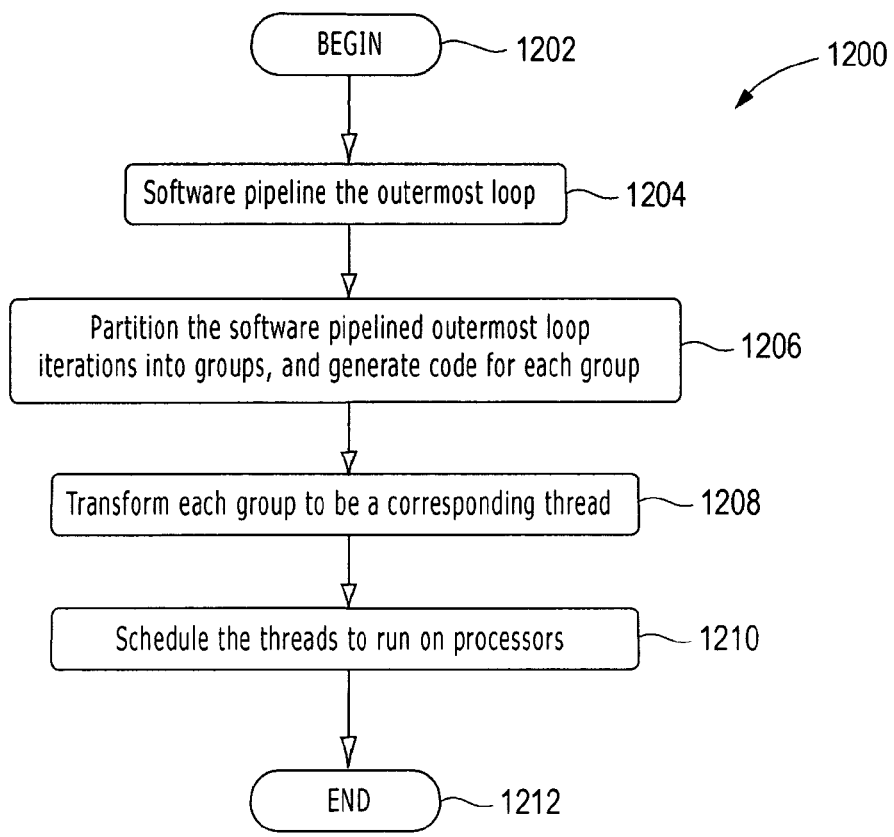
FIG. 12 is a flowchart of exemplary steps for processing computer instructions in accordance with another aspect of the present invention.

FIG. 12 depicts a flow chart 1200 of exemplary steps for processing computer instructions in accordance with another aspect of the present invention. In accordance with this aspect, the concepts described above with reference to a single processor environment are applied to a multiprocessor environment. In the multiprocessor environment, multiple processors run the generated object code for the groups. As used herein, the term processor is meant to include individual processors and processing units. A single processor may include multiple processing units. For example, a multi-threaded processor may contain multiple processing units.

Processing begins at block 1202 with software pipelining of an outermost loop of a loop nest at block 1204. In an exemplary embodiment, the outermost loop may be essentially any loop level other than the innermost loop. As described above, the loop level for the outermost loop is selected based on a good potential for instruction-level parallelism and data reuse optimization. In an exemplary embodiment, the outermost loop may be software pipelined according to the resources of one of the processors and the dependencies in the outermost loop to create a software kernel that is used as a template to generate code for every processor. In an alternative embodiment, the outermost loop may be software pipelined separately for each of the processors according to the resources of each processor and the dependencies in the outermost loop to create multiple software kernels. Each software kernel may be used as a template to generate code for the corresponding processor. For ease of description, a software kernel found through software pipelining that is to be used as a template to generate code for a corresponding processor may be referred to herein as "the processor's software kernel."

At block 1206, the outermost loop is partitioned into groups. In addition, the groups are mapped to the processors that will process the groups. In an exemplary embodiment, the mapping may be essentially arbitrary, e.g., a group may be assigned to any of the processors. This may be an advantageous approach when all of the processors are homogeneous, for example. In an alternative exemplary embodiment, the mapping may be deterministic, e.g., specific groups are assigned to specific processors. This may be an advantageous approach when one or more of the processors are heterogeneous, for example. For ease of description, the processor to which a group is mapped may be referred to herein as "the group's corresponding processor."

Each group may contain one or more iterations of the outermost loop. Typically, the size of an individual group (i.e., the number of outermost loop iterations in the group) depends on the group's corresponding processor and, consequently, on the processor's software kernel, e.g., as described above for a single processor environment. In an exemplary embodiment, the size of the group is equal to the number of stages in the innermost loop of the processor's software kernel, i.e., $S_n$. Thus, if the corresponding processor's software kernel for a group has three stages in its innermost loop (i.e., $S_n=3$), that group may be assigned three outermost loop iterations, while another group may be assigned two outermost loop iterations if its corresponding processor's software kernel has two stages in its innermost loop (i.e., $S_n=2$). Although groups with outermost loop iterations of three or less have been described above, one or more groups may contain more iterations. Typically, if different processors have different kernels, one or more of the groups are sized differently.

In an alternative exemplary embodiment, each groups may be individually sized based on the corresponding processor's software kernel and speed (e.g., clock frequency, instruction handling capability, etc.). For example, assuming a software kernel having three stages in its innermost loop (i.e., $S_n=3$), a relatively fast processor may be assigned groups having three iterations of the outermost loop and a relatively slow processor may be assigned groups having two iterations of the outermost loop. In alternative exemplary embodiments, each group may be individually sized based on other considerations such as power consumption in addition to or instead of those described above.

A last group may have an extra boundary condition that is considered when determining its size. This extra boundary condition may be based on the total number of outermost loop iterations. For example, if there are five outermost loop iterations and each group before the last group has two outermost loop iterations, the last group can have only one outermost loop iteration.

A group is generated essentially as described above with reference to FIGS. 1, 3, and 4 with the exception that a decision is unnecessary regarding whether all groups have been initiated (e.g., blocks 110, 310, and 410) because each processor receives one group at a time. Further, the feedback loop for processing the next group can be omitted with processing proceeding directly to draining the group (e.g., blocks 112, 312, and 412). If the feedback loop is omitted, each iteration may access the register file statically and, thus, register file rotation is unnecessary. Register file rotation may still be employed using appropriate initial settings to control the rotations. For example, for IA-64 computer architecture, the following changes to LC and EC may be made in block 402: LC=size of the group minus 1 and EC=$1_n$–LC or greater.

At block 1208, each group is transformed into a corresponding thread for scheduling and processing. Methods for transforming threads for scheduling and processing will be understood by one of skill in the art from the description herein.

Figure 13:
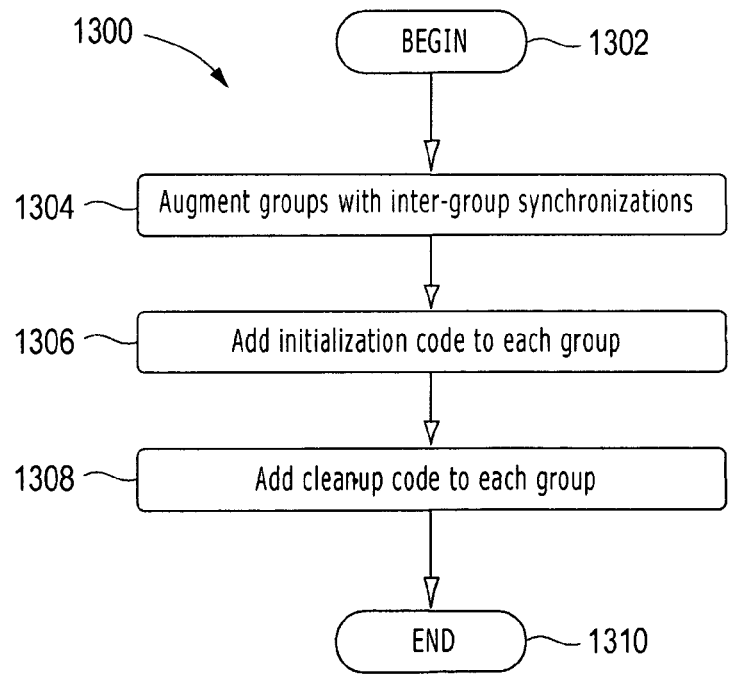
FIG. 13 is a flowchart of exemplary steps for performing the augmentation steps of FIG. 12.

FIG. 13 depicts a flow chart 1300 of exemplary steps for transforming a group into a corresponding thread. Processing begins at block 1302 with the augmentation of each group with inter group synchronizations at block 1304. For example, if a first group needs to wait for a result from a processing step within a second group, synchronization steps are added to the first group to suspend processing until the processing step within the second group are complete and synchronization steps are added to the second group to notify the first group when the processing step within the second group are complete.

At block 1306, thread initialization code is added to each group and, at block 1308, thread cleanup code is added to each group. In an exemplary embodiment, the thread initialization code and the cleanup code each include conventional code that will be understood by one of skill in the art. Processing ends at block 1310.

Referring back to FIG. 12, at block 1210, the threads are scheduled for processing. In an exemplary embodiment, each processor in the multiple processor environment is identical. In an alternative exemplary embodiment, at least one processor is different from another processor in the multiple processor environment. Threads may be scheduled using a conventional operating system that will be understood by one of skill in the art.

Figure 14:
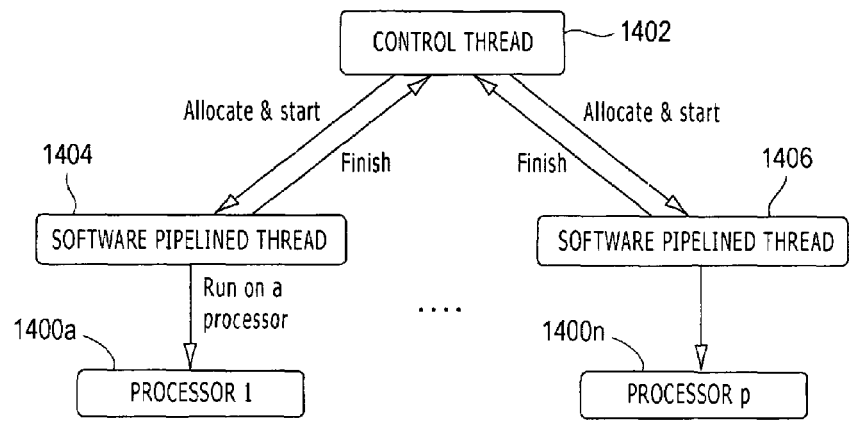
FIG. 14 is a block diagram depicting one embodiment for scheduling software pipelined threads in accordance with an aspect of the present invention.

FIG. 14 depicts an exemplary embodiment for scheduling software pipelined threads to processors. In the illustrated embodiment, there are a plurality of processors 1400a-n. A control thread 1402 schedules the software pipelined threads to the processors 1400. In addition, the control thread 1402 initiates processing of each software pipelined thread and identifies when each software pipelined thread has finished executing.

In the illustrated embodiment, the control thread 1402 allocates a first software pipelined thread 1404 to run on a first processor 1400a and a second software pipelined thread 1406 to run on a second processor 1400n. A start indicator is passed from the control thread 1402 to the first software pipelined thread 1404 indicating when the first processor 1400a should start processing the first software pipelined thread 1404 and a separate start indicator is passed from the control thread 1402 to the second software pipelined thread 1406 indicating when the second processor 1400n should start processing the second software pipelined thread 1406. In addition, a finish indicator is passed from the first software pipelined thread 1404 to the control thread 1402 indicating that the first processor 1400a has finished processing the first software pipelined thread 1404 and a separate finish indicator is passed from the second software pipelined thread 1406 to the control thread 1402 indicating that the second processor 1400n has finished processing the second software pipelined thread 1406. In an exemplary embodiment, cleanup code associated with each software pipelined thread generates the finish indicators so that the control thread 1402 can schedule other software pipelined threads.

In an alternative exemplary embodiment, all software pipelined threads are ready for scheduling at the same time. The operating system then invokes them one by one in a sequence without the need for a control thread. In another alternative exemplary embodiment there is originally only one thread. When the original thread is run, it spawns another thread, which is a copy of itself, that the operating system invokes to run later. Thus, this embodiment is also able to schedule threads without the need for a control thread.

In an alternative exemplary embodiment, the groups (or software pipelined threads corresponding to the groups) are scheduled to the processors in rounds with each processor assigned one group at a time and all processors being allowed to finish execution of all the groups assigned for a current round before executing groups assigned in a subsequent round. For example, a global barrier may be put between two successive rounds. All groups in a current round can be scheduled concurrently, without the operating system invoking them one by one, as long as the groups have software and/or hardware synchronizations between them to maintain the correct running order, which is described in further detail below. Typically, the groups in a current round are adjacent groups. For example, assuming three processors and five groups, in a first round, the first three groups are scheduled to the three processors, respectively, and, in the next round, the remaining two groups are scheduled to two of the three processors, respectively.

Figure 15:
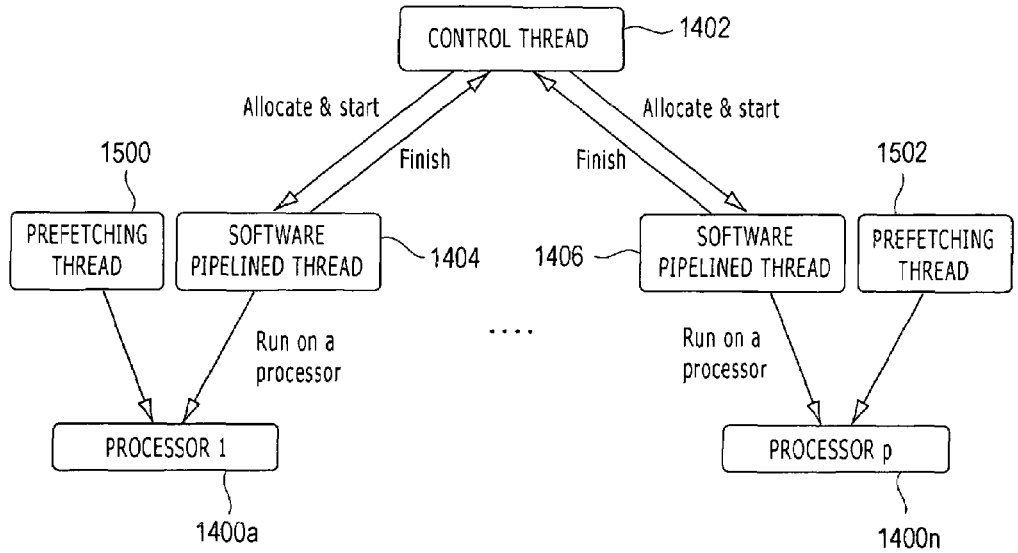
FIG. 15 is a block diagram depicting another embodiment for scheduling software pipelined threads in accordance with an aspect of the present invention.

FIG. 15 depicts an alternative exemplary embodiment for scheduling software pipelined threads. This embodiment is similar to the embodiment described above with reference to FIG. 14 with the addition of pre-fetching threads (represented by pre-fetching threads 1500 and 1502) associated with the software pipelined threads, e.g., software pipelined threads 1404 and 1406. The pre-fetching threads pre-fetch data from memory to the cache, register file, and/or local memory of the processor where the corresponding software pipelined thread is located. Parallel execution of software pipelined thread and pre-fetching threads enable reductions in apparent memory latencies.

An example is now provided with reference to FIGS. 16A-16D. FIG. 16A depicts processing instructions of a loop nest having two loops. In the illustrated processing instructions, L1 is an outer loop and L2 is an inner loop. For illustrative purposes, assume each statement in the loop nest is a machine operation with unit latency and that two function units for processing statements are available in each processor.

FIG. 16B depicts a "running scheme" after software pipelining the outermost loop, e.g., L1 (with $N_1=6$ and $N_2=3$ for ease of description). The software pipelined threads are partitioned into groups, with each group including one or more iterations of the instructions in the outer loop. In the illustrated embodiment, each group includes two iterations of the instructions within the outer loop corresponding to the two function units of the assumed processors.

FIG. 16C is a data dependence graph (DDG) depicting dependencies of the loop nest of FIG. 16A. The data dependence graph depicts instructions within the loop nest and iteration distance vectors between these instructions.

FIG. 16D depicts software pipelined (SWP) threads, e.g., for the group starting with the outermost loop iteration having an index value of $i_1$. In an exemplary embodiment, synchronizations are added for the dependence "a" to "a" that crosses groups. In the illustrated embodiment, for each instance of the dependence that crosses from one group to another, "signal" is inserted after the source operation of the dependencies instance and "wait for signal" is inserted before a "sink" operation of the dependence instance. In this example, if the source operation is $a(i_1, i_2)$, then the signal sent out is denoted as $s(i_1, i_2)$.

FIG. 16D illustrates a software approach to synchronization. In an alternative exemplary embodiment, synchronization may be implemented in hardware. For example, shared registers between processors may be used to resolve memory dependences between processors. For each inter-outermost loop iteration inter-processor memory dependence, the source operation in one processor may write to a specific shared register and a "sink" operation in the other processor may fetch the value from this register. To indicate whether a shared register contains a value, a bit associated with the register can be defined that indicates the register is full when it is set. The other processor can then periodically examine this bit to determine if there is a value for it to fetch. For processors synchronized in a lock-step manner, this extra bit may be omitted. The number of shared registers between processors may be determined from the total number of dependencies among the groups. Additional shared registers may be employed to enable more flexible execution by the processors.

In an exemplary embodiment, one processor may be treated differently from the other processors in the multiprocessor environment. Conceptually, assume a row of processors. A first processor in the row may have different code from the other processors. For example, in the scheduling step, the operations to be scheduled for the first processor are such that the sink operations may read from a memory rather than a shared register. This is because the first processor is unable to read from a shared register because there is not a previous outermost loop iteration performed by another processor to generate a value for the shared register. In addition, there are typically more groups than processors in the multiprocessor environment and, therefore, one or more processor has to finish its assigned group and then run another group assigned to it. Thus, a last processor may have to write a value to a shared register and wait for the first processor to consume it. If the first processor is busy with a previously assigned group, however, the last processor may stall and, subsequently, the other processors may stall, e.g., due to fine-grain synchronization enforced by the shared registers. This can be avoided by having the first processor always reads from a memory and the other processor write to that memory for information shared with the first processor.

Reading from a memory rather than a shared register should not delay execution time unless the "cache miss" ratio is high. This can be avoided by selecting the fastest processor as the first processor or pre-loading data into the cache of the first processor. To alleviate cache pressure, a memory reading operation of the first processor, e.g., load r=[addr], can be changed by giving it a predicate p: (p) load r=[addr], where p is one (1) for the first outermost loop iteration within the group currently assigned to the first processor, but 0 for the other outermost loop iterations within the group currently assigned to the first processor. Subsequent processors for processing subsequent groups may read from a shared register. Thus, only the first outermost loop iteration within the group currently assigned to the first processor needs to read from memory, and the cache may be pre-loaded for this iteration. If the memory dependency distance is more than 1 outermost loop iteration, e.g., two outermost loop iterations, then the first two outermost loop iterations within the group currently assigned to the first processor can have this predicate.

The various aspects of the present invention provide advantages such as simultaneous instruction level and iteration level parallelism, static resource allocation at the instructions level, and extended software pipelining usefulness, among others. For simultaneous instruction level and iteration level parallelism, software pipelining and multithreading are used to exploit different granularities of parallelism. Software pipelining exploits instruction level parallelism and multithreading exploits iteration level parallelism. Software pipelining of an outer loop is especially advantageous for use in multiple processor processing environments. For static resource allocation at instruction level, software pipelining is performed prior to runtime. Thus, resources are statically allocated prior to runtime and competition for resources is eliminated. This leads to simpler hardware, shorter processing cycles, and better system performance. For extended usefulness of software pipelining, software pipelining and multithreading are combined to allow the software pipelined code to be dynamically controlled/synchronized to observe some dependences that can not be fully handled in static scheduling approaches.

One or more of the steps described above may be implemented in software on a computer (not shown). In this embodiment, one or more of the functions of the various components may be implemented in software that controls the computer. This software may be embodied in a computer readable carrier, for example, a magnetic or optical disk or a memory card.

Additional detail related to the various aspects of the present invention can be found in the following (each of which are incorporated herein fully by reference): *Single-Dimension Software Pipelining for Multi-Dimensional Loops* by Rong et al. in a Computer Architecture and Parallel Systems Laboratory (CAPSL) Technical memo 049 available from the University of Delaware (a condensed version of which was published in Proceedings of the 2004 International Symposium on Code Generation and Optimization (CGO) held in March 2004); *Code Generation for Single-Dimension Software Pipelining of Multi-Dimensional Loops* by Rong et al. published in Proceedings of the 2004 International Symposium on Code Generation and Optimization (CGO) held in March 2004; and doctorate thesis entitled *Software Pipelining of Nested Loops* by Dr. Hongo Rong at Tsinghua University, China, April 2001 (available from the library of Tsinghua University).

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for processing a software kernel of instructions, the software kernel having a plurality of stages representing a loop nest having an outermost loop and at least one inner loop within the outermost loop, the at least one inner loop including an innermost loop, the method comprising the steps of:
   (a) partitioning iterations of the outermost loop into groups, each group representing two or more iterations of the outermost loop to be run at least partially in parallel;
   (b) running the software kernel and rotating at least one register file for each stage of the software kernel preceding the innermost loop to generate code to prepare for filling and executing instructions in software pipelines for a current group;
   (c) running the software kernel for each stage of the software kernel in the innermost loop to generate code to fill the software pipelines for the current group, the at least one register file being rotated after at least one run of the software kernel for the innermost loop; and
   (d) repeatedly running the software kernel to unroll the at least one inner loop to generate code to further fill the software pipelines for the current group, wherein the at least one inner loop of each of the two or more iterations of the outermost loop in the current group is unrolled to run sequentially such that within each iteration of the outermost loop all instructions of an iteration of the at least one inner loop are executed before any instruction of a next iteration of the at least one inner loop is executed.

2. The method of claim 1, wherein one or more of the at least one register file is a rotating register file.

3. The method of claim 1, wherein the at least one register file includes at least one of (i) an integer rotating register file, (ii) a floating-point rotating register file, or (iii) a predicate rotating register file.

4. The method of claim 1, further comprising the steps of:
   (e) repeating steps c and d until a last outermost loop iteration has been initiated.

5. The method of claim 1, further comprising the step of: running the software kernel to drain the software pipelines for one or more unfinished groups.

6. The method of claim 1, wherein the step of running the software kernel to unroll the at least one inner loop is performed using static register renaming.

7. The method of claim 1, wherein the partitioning step comprises the step of:
   partitioning iterations of the outermost loop such that each group includes a number of iterations equal to the number of stages in the innermost loop.

8. The method of claim 1, wherein the steps are executed according to the Intel IA-64 computer architecture.

9. The method of claim 1, wherein step c is performed further to drain the software pipelines for a previous group preceding the current group.

10. The method of claim 9, wherein filling of the software pipeline for the current group and draining of the software pipelines for the previous group are performed concurrently.

11. The method of claim 1, further comprising the steps of:
    augmenting each group with thread information to generate corresponding software pipelined threads; and
    scheduling the software pipelined threads.

12. The method of claim 11, wherein the scheduling step comprises the step of:
    scheduling the software pipelined threads to run on a plurality of processors.

13. The method of claim 12, wherein the software pipelined threads are scheduled to the processors in rounds, each processor being scheduled one software pipelined thread corresponding to one group at a time, and all processors finishing execution of all groups corresponding to software pipelined threads of a current round before execution of groups corresponding to software pipelined threads of a subsequent round.

14. The method of claim 12, wherein the number of iterations in each group is based on each of the plurality of processors.

15. The method of claim 14, wherein a first group includes a first number of iterations of the outermost loop and a second group includes a second number of iterations of the outermost loop and wherein the first and second numbers of iterations are different.

16. The method of claim 15, wherein the number of iterations of the outermost loop in each group is based on the resources of the processor to which the group is to be scheduled.

17. The method of claim 15, wherein the number of iterations of the outermost loop in a group is based on the speed of the processor to which the group is to be scheduled.

18. The method of claim 15, wherein the software kernel is applied to each processor and the number of iterations of the outermost loop in each group is determined based on the software kernel and at least one of (i) the resources of the processor or (ii) the speed of the processor to which the group is to be scheduled.

19. The method of claim 15, wherein different software kernels are applied to different processors based on the resources of the processor and the number of iterations of the outermost loop for each group is determined based on at least one of (i) the software kernel for the group or (ii) speed of the processor to which the group is to be scheduled.

20. The method of claim 12, further comprising the step of:
    prefetching data for at least a first iteration for a first of the processors based on dependence distances.

21. The method of claim 12, further comprising the step of:
    communicating data for a first group from a first of the plurality of processors to a second of the plurality of processors processing a second group using a shared register file.

22. The method of claim 12, further comprising the step of:
    reading data from a memory for an initial group being processed by a first processor; and
    reading data from a shared register file for a subsequent group being processed by a second processor.

23. The method of claim 11, wherein each software pipelined thread is associated with a prefetching thread.

24. A computer readable carrier including software that is configured to control a computer to implement a processing method embodied in a computer readable medium for processing a software kernel of instructions, the software kernel having a plurality of stages representing a loop nest having an outermost loop and at least one inner loop within the outermost loop, the at least one inner loop including an innermost loop, the processing method including the steps of:

(a) partitioning iterations of the outermost loop into groups, each group representing two or more iterations of the outermost loop to be run at least partially in parallel;

(b) running the software kernel and rotating at least one register file for each stage of the software kernel preceding the innermost loop to generate code to prepare for filling and executing instructions in software pipelines for a current group;

(c) running the software kernel for each stage of the software kernel in the innermost loop to generate code to fill the software pipelines for the current group, the at least one register file being rotated after at least one run of the software kernel for the innermost loop; and (d) repeatedly running the software kernel to unroll the at least one inner loop to generate code to further fill the software pipelines for the current group, wherein the at least one inner loop of each of the two or more iterations of the outermost loop in the current group is unrolled to run sequentially such that within each iteration of the outermost loop all instructions of an iteration of the at least one inner loop are executed before any instruction of a next iteration of the at least one inner loop is executed.

25. The computer readable carrier of claim 24, wherein the method implemented by the computer further includes the steps of:

(e) repeating steps c and d until a last outermost loop iteration has been initiated.

26. The computer readable carrier of claim 24, wherein the method implemented by the computer further includes the steps of:

running the software kernel to drain the software pipelines for one or more unfinished groups.

27. The computer readable carrier of claim 24, wherein the partitioning step for implementation by the computer comprises the step of:

partitioning iterations of the outermost loop such that each group includes a number of iterations equal to the number of stages in the innermost loop.

28. The computer readable carrier of claim 24, wherein the method implemented by the computer further includes the steps of:

augmenting each group with thread information to generate corresponding software pipelined threads; and scheduling the software pipelined threads.

29. The computer readable carrier of claim 28, wherein the scheduling step for implementation by the computer comprises the step of:

scheduling the software pipelined threads to run on a plurality of processors.

30. The computer readable carrier of claim 29, wherein the method implemented by the computer further includes the steps of:

communicating data for a first group from a first of the plurality of processors to a second of the plurality of processors processing a second group using a shared register file.

31. The computer readable carrier of claim 29, wherein the method implemented by the computer further includes the steps of:

reading data from a memory for an initial group being processed by a first processor; and reading data from a shared register file for a subsequent group being processed by a second processor.

32. The computer readable carrier of claim 29, wherein the method implemented by the computer further includes the step of:

prefetching data for at least a first iteration for a first of the processors based on dependence distances.

* * * * *